March 12, 1929.  D. B. PENNY  1,705,337
NUT LOCK
Filed Aug. 28, 1928
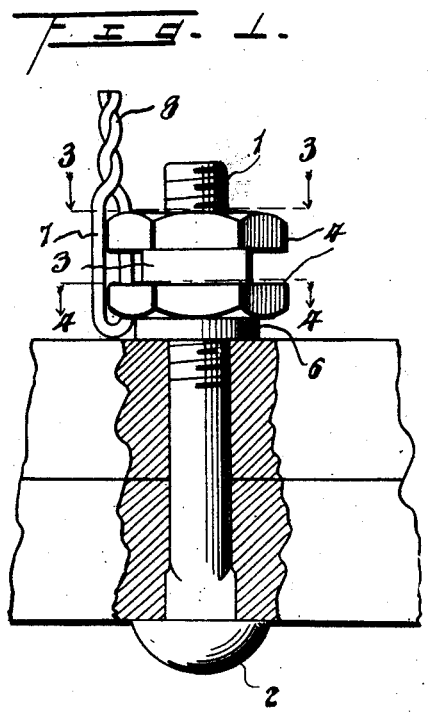
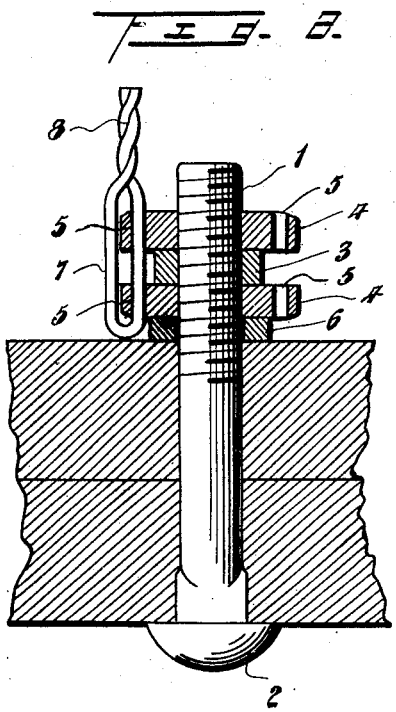
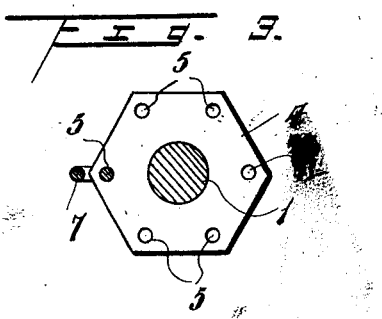
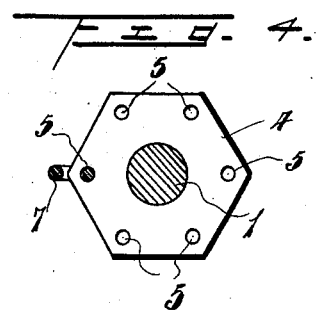
Inventor
David B. Penny.
By Watson E. Coleman.
Attorney Patented Mar. 12, 1929.

1,705,337

UNITED STATES PATENT OFFICE.

DAVID B. PENNY, OF ST. PARIS, OHIO.

NUT LOCK.

Application filed August 28, 1928. Serial No. 302,595.

This invention relates to a nut lock and has for its primary object to provide in a manner as hereinafter set forth an improved means for locking the nut securely in position upon the bolt, this means being of such character that the nut may be quickly released for removal when its removal is desired.

The invention broadly contemplates the provision of a pair of complementary washer nuts which are designed to be threaded upon the shank of the bolt upon opposite sides of the usual nut, these washer nuts being apertured about the periphery for the reception of a tie wire which acts to prevent them from rotating from locking position.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claim.

In the drawings:

Figure 1 is a view in side elevation of the locking nut embodying the present invention;

Figure 2 is a central longitudinal sectional view of the same;

Figure 3 is a transverse section upon the line 3—3 of Figure 1;

Figure 4 is a transverse section taken upon the line 4—4 of Figure 1.

Referring to the drawing in detail, the numeral 1 indicates the shank of a bolt, the same being provided with the usual head 2 which may of the polygonal formation or rounded as in a carriage bolt.

The shank 1 is threaded upon its outer end and adapted to be threadably mounted thereon is a nut having positioned against opposite faces thereof the complementary washer nuts 4, each of which is of relatively thin formation and is provided about its periphery with the apertures 5.

When the bolt 1 is extended through a piece of material, there is interposed between the material and the innermost one of the nuts 4 a washer 6. The inner nut 4 is then tightened against the washer, the nut 3 drawn to position against the inner washer nut 4 and the outer one of the washer nuts 4 is then tightened up against the nut 3. The three nuts are thus securely locked together and to prevent any possibility of their working loose as the result of jars or vibrations to which the material in which the bolt is mounted is subjected, there is extended through aligned ones of the apertures 5 in the locking or washer nuts 4 a tie wire 7, the ends of which are securely twisted together, as at 8.

The nut 3, as clearly shown, is of much less width than the locking or washer nuts 4, so that no interference will be offered the passage of the tie wire 7.

From the foregoing description, it will be readily seen that the combination of locking nuts shown will remain securely in place against all shocks or jars to which the work carrying the bolt may be subjected.

Having thus described my invention, what I claim is:—

A nut lock comprising in combination with a threaded bolt, a nut body threadably mounted upon the bolt, a pair of complementary locking nuts each of greater overall width than the first mentioned nut and designed to be threaded onto the bolt upon opposite faces of the first mentioned nut, each having a series of apertures formed therethrough adjacent the periphery thereof, and a tie wire designed to be extended through aligned apertures of the two locking nuts and have the ends thereof twisted together to secure the same against accidental rotation.

In testimony whereof I hereunto affix my signature.

DAVID B. PENNY.